Oct. 11, 1949. J. M. KEEL 2,484,412
METHOD OF MAKING REAL ESTATE CHARTS
Filed May 27, 1947
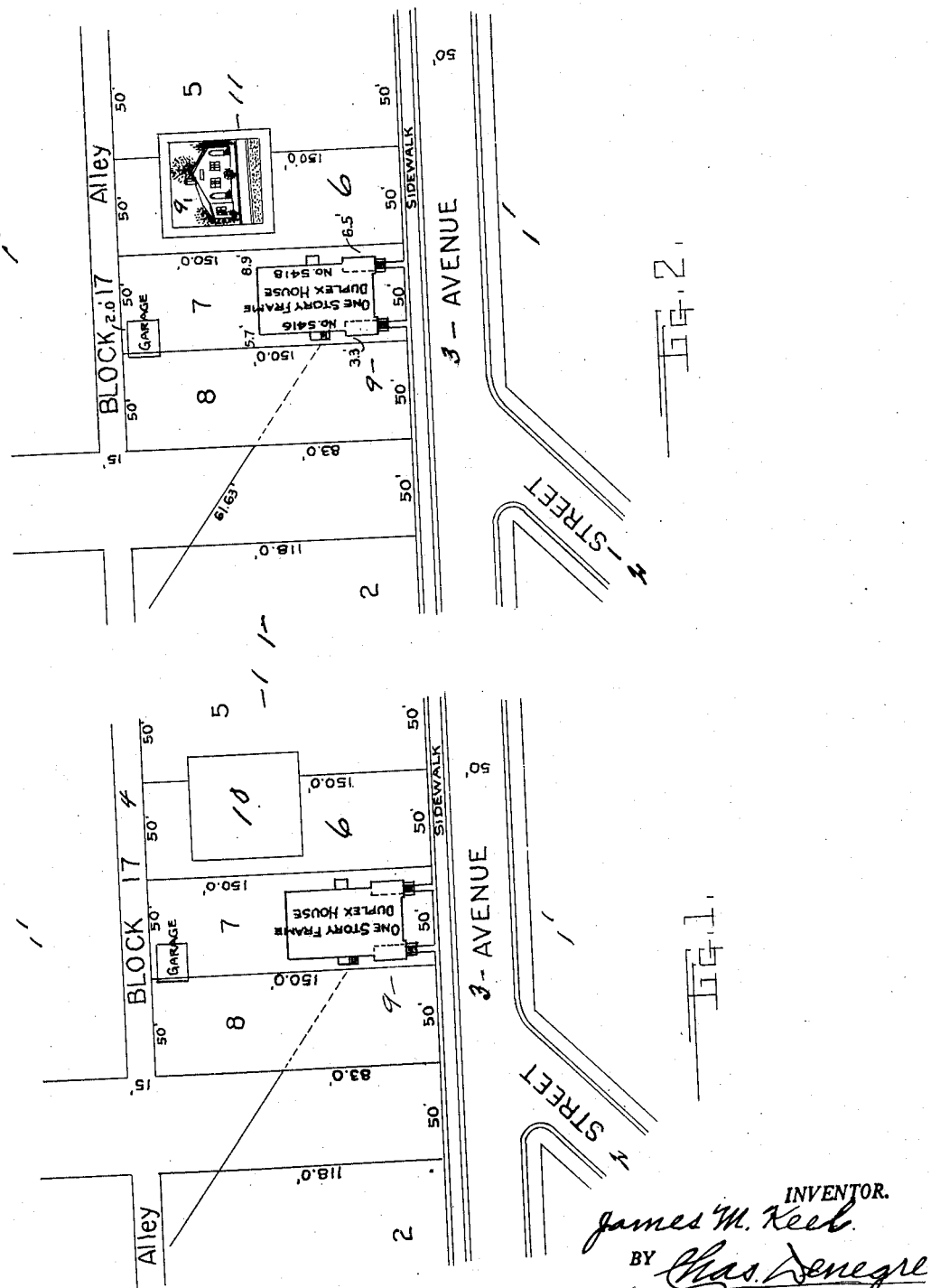
INVENTOR.
James M. Keel.
BY Chas. Denegre
Attorney.

Patented Oct. 11, 1949

2,484,412

UNITED STATES PATENT OFFICE 2,484,412

METHOD OF MAKING REAL ESTATE CHARTS

James M. Keel, Birmingham, Ala.

Application May 27, 1947, Serial No. 750,654

2 Claims. (Cl. 35—7)

This invention relates to a method of making a real estate survey or chart and has for its main object to provide a chart that will be more efficient and satisfactory than any such heretofore used for the purpose intended. In the making of a survey or chart of real property with improvements thereon for the purpose of a sale, a loan or insurance, there is no way of showing what the improvements look like without taking a separate photograph to be displayed along with the chart. The present invention by providing a method of making a survey or chart with a picture of the building as an integral part of the chart overcomes this objection. In the present method all information is placed upon a single sheet of paper or blue print. Other objects and advantages will appear from the drawing and description.

By referring to the drawing, part of this application, it will be observed that Fig. 1 is a plan view of a specimen of a chart with the place for the house picture cut out of the paper; and Fig. 2 is a plan view of the same chart showing the picture of the house as an integral part of the chart.

Similar reference numerals refer to similar parts or locations throughout the drawings.

Referring to the drawing in detail it will be seen that the specimen chart or survey 1 shows a street 2, an avenue 3, an alley 4, lots 5, 6, 7 and 8 in block 17. The house 9 on the lot 7 faces the avenue 3. The chart when partly completed, according to the present method, appears as shown in Fig. 1 with a part of the drawing paper cut out thus leaving an approximately square hole 10 in the paper. Then a picture is taken of the house 9 by a camera that will produce a negative 11 with a larger area than the size of the hole in the paper. Then the negative is stuck with paste on its edge to the paper chart and in register with the hole in the paper. In this condition blue prints are made from the chart with the negative stuck thereon, resulting in the prints being produced with the actual picture of the house integral with the blue print as shown in Fig. 2.

The surveys or charts may be made in any size desired and with pictures of several buildings shown on a single chart as any number of negatives may be used in the same manner as shown by the specimen drawing.

While I have shown and described the preferred embodiment of my invention, I do not wish to limit same to the exact and precise details of carrying out the method, but reserve the right to make all modifications and changes so long as they remain within the spirit and scope of the following claims.

Having described my invention, I claim:

1. In a method of making a real estate survey comprising the following progressive steps; first making the necessary measurements of the subject property with a building thereon, then placing the measurements in lines and figures upon a sheet of standard drawing paper, then cutting a part of the sheet of paper out to form a predetermined size of hole in the sheet of paper, then taking a picture of the building on the property with a camera that will produce a negative of larger area than the area of the hole in the paper, then attaching the negative by means of paste on its surrounding edge to the same sheet of paper with the negative positioned over and in register evenly with the hole in the paper and with the outline of the building in the negative in proper position with relation to the lines and figures on the sheet of paper, then making blue prints or other positive reproductions from the chart with the negative stuck thereon, to thus have the lines and the figures and the picture of the building integral in one positive sheet of paper.

2. In a method of making a land with building thereon survey or chart comprising; first making the necessary measurements of the subject property, then placing the measurements in lines and numerals upon a sheet of drawing paper, then cutting a hole in the sheet of paper at the location of the building thereon, then attaching a photographic negative of the said building over the hole in the paper, then making a print of the sheet of paper with said negative thereon.

JAMES M. KEEL.

REFERENCES CITED

The following references are of record in the file of this patent:

UNITED STATES PATENTS

| Number | Name | Date |
|---|---|---|
| 575,731 | Powers et al. | Jan. 26, 1897 |
| 1,404,613 | Hormes | Jan. 29, 1922 |
| 2,287,568 | Jue | June 23, 1942 |
| 2,309,390 | Grossguth et al. | Jan. 26, 1943 |
| 2,381,165 | Hoffman | Aug. 7, 1945 |